United States Patent [19]
McCartney, Jr.

[11] Patent Number: 5,311,337
[45] Date of Patent: May 10, 1994

[54] COLOR MOSAIC MATRIX DISPLAY HAVING EXPANDED OR REDUCED HEXAGONAL DOT PATTERN

[75] Inventor: Richard I. McCartney, Jr., Scottsdale, Ariz.

[73] Assignee: Honeywell Inc., Minneapolis, Minn.

[21] Appl. No.: 949,618

[22] Filed: Sep. 23, 1992

[51] Int. Cl.$^5$ .................... G02F 1/133; G09G 3/34
[52] U.S. Cl. ........................... 359/61; 359/68; 359/87
[58] Field of Search ............ 359/54, 55, 61, 68, 359/89, 87, 891; 340/702, 784; 345/88, 152

[56] References Cited

U.S. PATENT DOCUMENTS

| | | | |
|---|---|---|---|
| 4,642,619 | 2/1987 | Togashi | 345/152 |
| 4,828,365 | 5/1989 | Stewart et al. | 359/68 |
| 5,052,785 | 10/1991 | Takimoto et al. | 359/61 |
| 5,144,288 | 9/1992 | Hamada et al. | 359/68 |
| 5,146,356 | 9/1992 | Carlson | 359/61 |

FOREIGN PATENT DOCUMENTS

| | | | |
|---|---|---|---|
| 0282823 | 12/1986 | Japan | 359/68 |
| 0228129 | 9/1988 | Japan | 359/68 |
| 4-086808 | 3/1992 | Japan | 359/61 |

OTHER PUBLICATIONS

"Irregular Color Filter Array For Liquid Crystal Displays" IBM Technical Disclosure Bulletin-vol. 33-No. 6B-Nov. 1990-pp. 70-71.

*Primary Examiner*—William L. Sikes
*Assistant Examiner*—Tai V. Duong
*Attorney, Agent, or Firm*—Dale E. Jepsen; Ronald E. Champion

[57] ABSTRACT

A display comprises a plurality of adjacent pixels wherein each pixel comprises three subpixels arranged in a triangular pattern, each having a hexagonal shape and substantially contiguous adjacent boundaries. This pattern allows predetermined subpixels to be increased or decreased in relative size without drastically affecting subpixel shape or the contiguous adjacent boundaries.

3 Claims, 6 Drawing Sheets

COLOR MOSAIC MATRIX DISPLAY HAVING EXPANDED OR REDUCED HEXAGONAL DOT PATTERN

FIELD OF THE INVENTION

This invention relates generally to displays, and more particularly to general purpose, color displays comprising a mosaic of three differently colored subpixels, which when activated in combinations, are used to generate a full color image. Specifically, this invention is a improvement on a mosaic pattern known as the delta pattern comprising a basic pixel which comprises three subpixels, one red, one green, and one blue in which each subpixel's geometric center is located at the vertex of a triangle.

BACKGROUND OF THE INVENTION

Various technologies have recently been developed as potential successors to the cathode ray tube (CRT). These technologies for the most part are flat panels comprising a large matrix of individually activated pixels which are used to form an image. In general these pixels are arranged into basic units which are repeated throughout the display surface known as the pixel pattern. Full color images are possible using these displays when the pixel pattern consists of at least one red, one green and one blue subpixel.

A matrix display, in its simplest form, comprises square subpixels arranged in a grid to permit addressing select lines to run in straight lines between the subpixels. This arrangement suffers in visual performance, however, because it injects aspects of the grid as pattern noise (tessellations) into the rendered image. This noise is particularly troublesome because the human visual system is acutely sensitive to periodic spatial frequency on the cardinal axes (vertical and horizontal).

One method of eliminating the appearance of tessellations produced by the grid is to increase the resolution of the display to the point at which the noise is beyond the threshold of detection. However, this solution requires increased complexity and associated costs and has practical physical limits. The delta arrangement is an alternative solution for increasing the apparent image quality without increasing the resolution.

In its simplest form, the delta arrangement consists of a modified grid in which every other row is shifted one-half element. While this simple shifted row delta pattern is an improvement over the grid arrangement, it still retains some of the deficiencies of the original grid pattern. One of these deficiencies is the pattern noise created by the square elements themselves. This noise patterning can be detected, for example, on image boundaries that are aligned with a row of the delta pattern display.

Another limitation of the shifted row delta configuration relates to the equal size of the subpixel color elements. Since the human visual system's spatial acuity is not constant with wavelength, certain color display subpixels contribute more to spatial image quality while other color subpixel elements contribute more directly to chromatic image quality. It would, therefore, be an advantage to be able to optimize spatial image quality by allocating a larger spatial area to the subpixel which contributes most to spatial image quality.

When red, green, and blue subpixel elements are used to create the color image, the blue element contributes less than the red or green elements to spatial image quality. It would, therefore, be advantageous to decrease the relative display area allocated to the blue subpixels and correspondingly increase the relative areas of the red and green subpixels.

In addition, it would be advantageous to allocate disproportionate areas of certain color subpixels to compensate for color balance. It is often desirable, particularly in color displays with gray levels, to design the luminosity of each display subpixel so that when it is activated in conjunction with the other subpixels, a particular color is obtained.

Relative area is one of several factors which control the apparent luminosity of a given subpixel. By designing the display with different proportional areas allocated to each primary color, it is possible to achieve a particular desired mix of colors without necessarily changing the luminance or spectral characteristics of the individual subpixel substances themselves.

SUMMARY OF THE INVENTION

It would, therefore, be advantageous to provide a color mosaic display comprising a plurality of subpixels wherein the subpixels are arranged in a pattern which avoids the horizontal and vertical spatial noise characteristics of a standard grid pattern and reduces the effects intrinsic to the shifted row delta pattern where the individual subpixel elements are of a uniform square shape. In addition, it would be advantageous to provide a color mosaic display comprising a number of subpixels wherein certain predetermined ones of said subpixels may be disproportionately larger or smaller than the other subpixels of the display, without significantly disturbing either of the relative positions of the adjacent subpixels or the basic shape of the subpixels.

The pixel pattern of the present invention is comprised of three subpixels each located at the vertex of a triangle and each subpixel having a hexagonal shape such that the adjacent boundaries of the subpixels within a given pixel, and the boundaries between adjacent pixels, are substantially contiguous. In addition, predetermined ones of the subpixels of this pattern may be either increased or decreased in relative size without drastically affecting the shape of the subpixels or the contiguous boundaries between adjacent subpixels and pixels.

The foregoing and other features of the invention will become apparent in the following detailed description of the invention in conjunction with the accompanying drawings wherein:

DESCRIPTION OF THE PREFERRED EMBODIMENT

Figure 1:
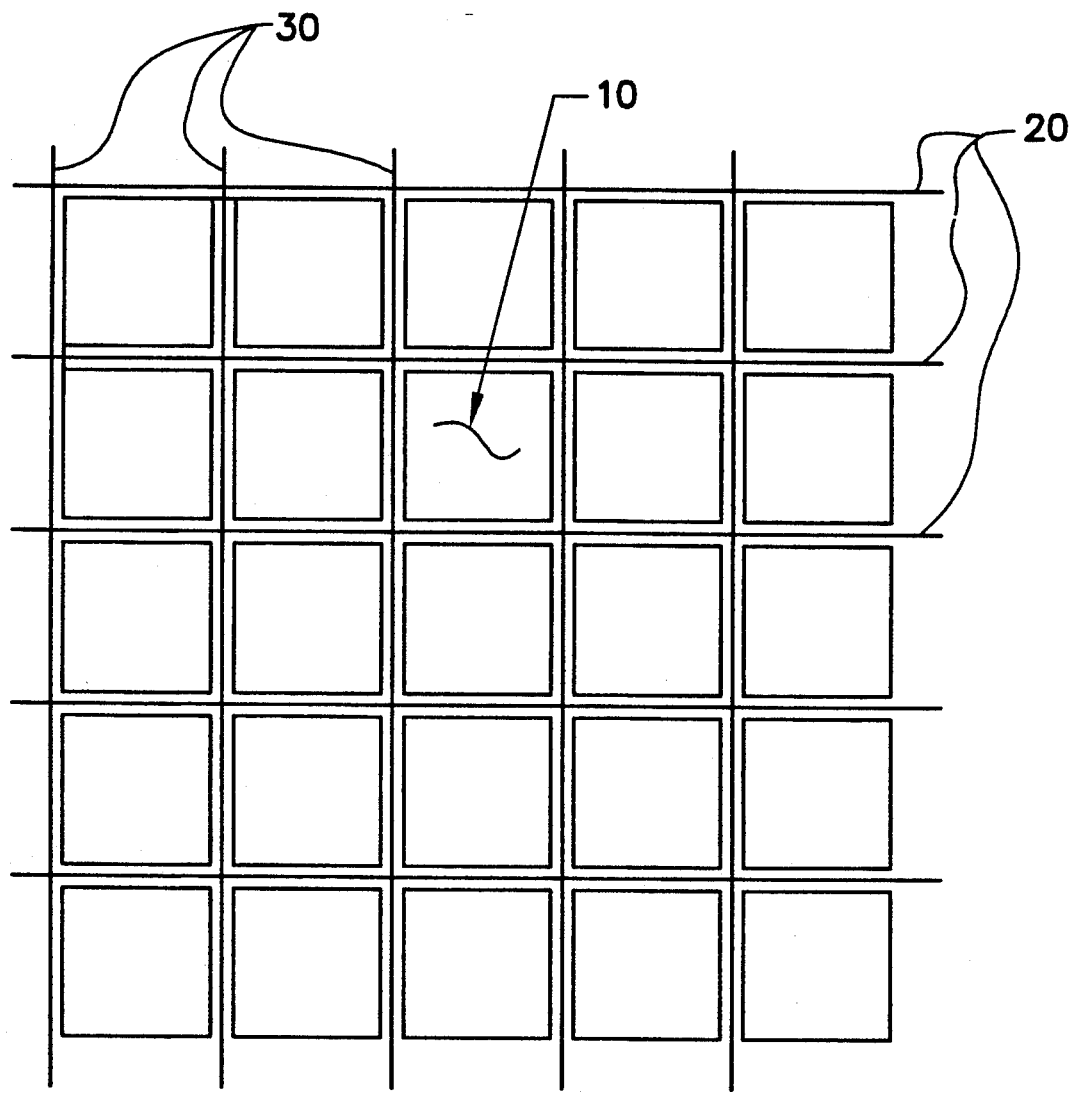
FIG. 1 illustrates a prior art grid arrangement.

Illustrated in FIG. 1 is a typical prior art grid display comprising a number of individual subpixels 10 arranged in a grid pattern. The individual subpixels may be arranged in groups of three subpixels, one each of color red, green, and blue in order to produce a full color image. Row address select lines 20 and column address select lines 30 are disposed between the individual subpixel elements in order to activate specific individual subpixels when generating the color image. As mentioned earlier, the very straight vertical and horizontal boundaries of this configuration cause significant noise or tessellations along the image boundaries of an image generated on this display.

Figure 2:
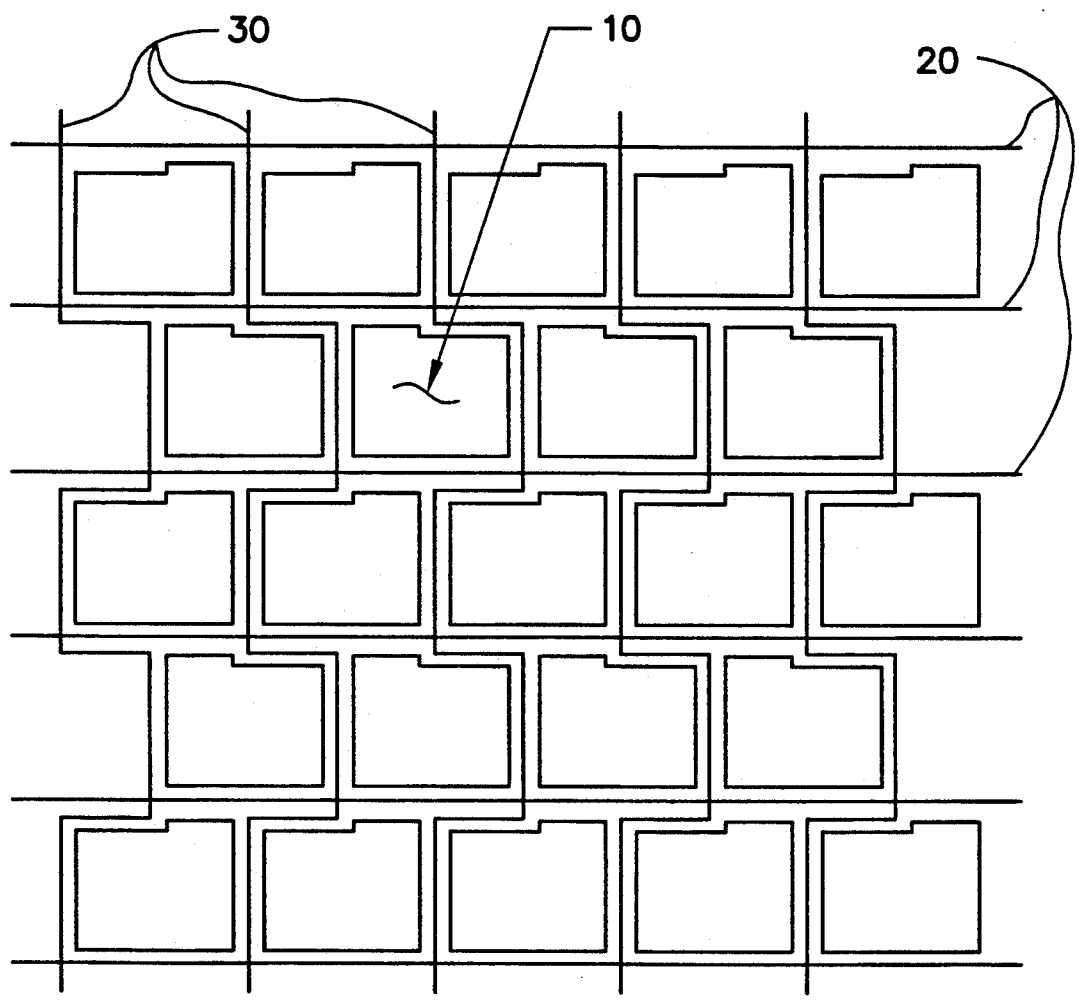
FIG. 2 illustrates the prior art shifted row delta arrangement.

In an attempt to somewhat alleviate the boundary noise problems a shifted row delta pattern has been used as illustrated in FIG. 2. As can be seen, alternative rows of subpixels 10 are shifted one-half element which results in a given group of three subpixels being arranged in a delta configuration. As before, the row address select lines 20 run straight across the display matrix between the individual subpixels. The column address select lines 30, however, must jog along the path between individual subpixels as illustrated. This results in a significantly longer column address select line for the shifted row delta pattern illustrated.

Figure 3A:
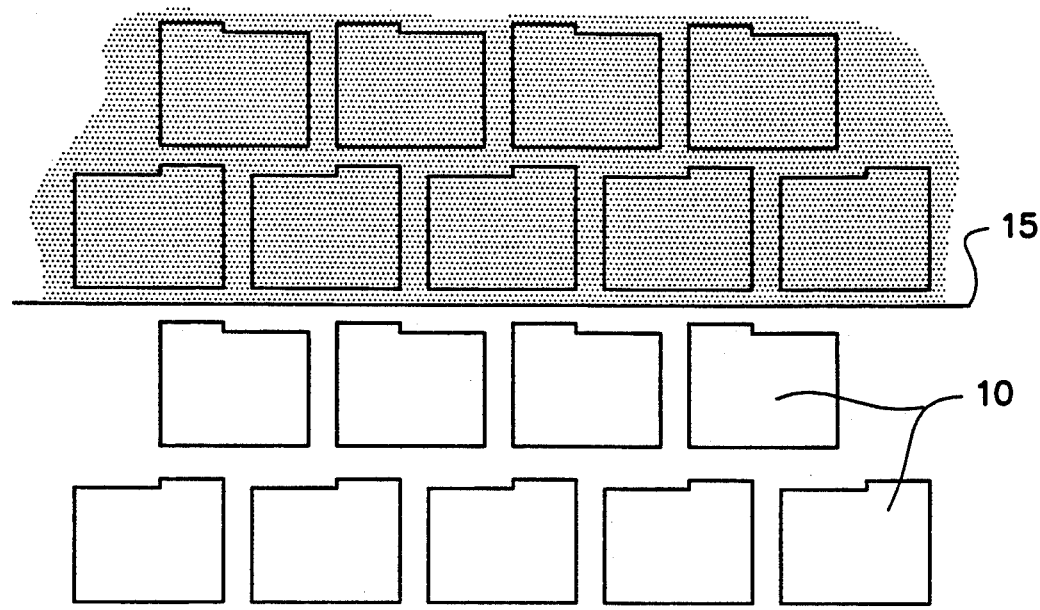
FIGS. 3a and 3b illustrate the change in image boundary noise as a function of image boundary orientation.
Figure 3B:
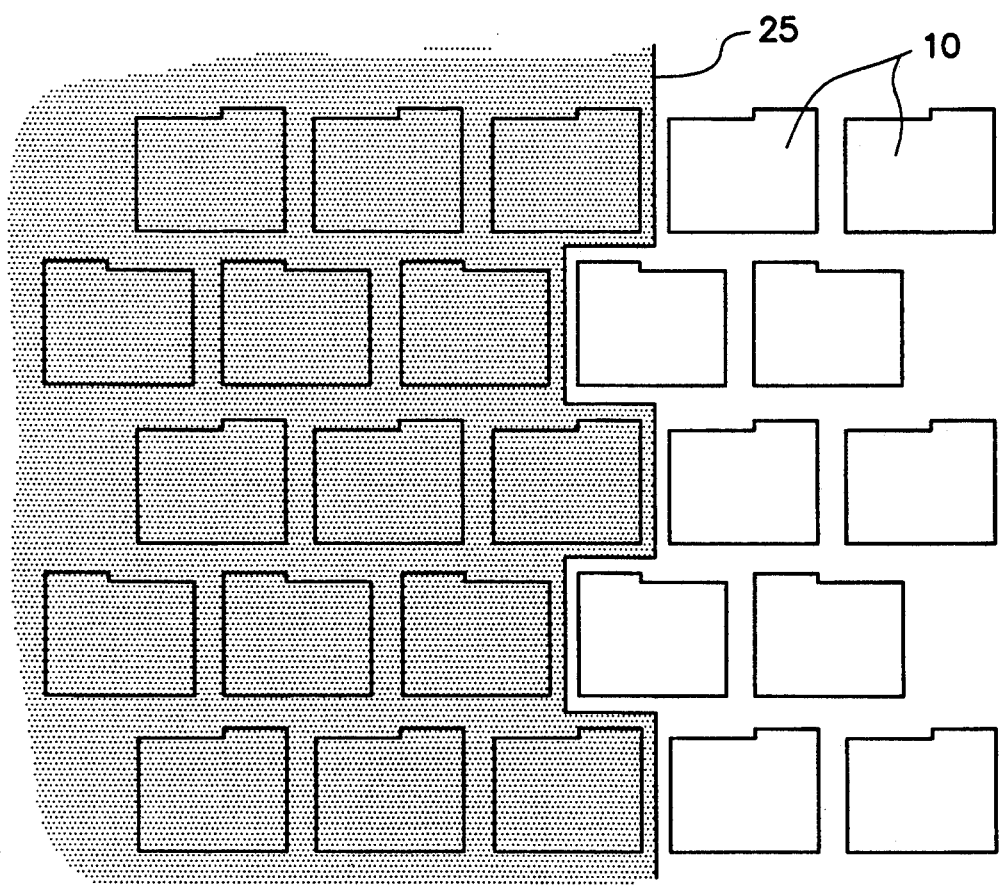

In addition, the shifted row delta pattern, while providing some improvement in image quality as a result of the delta shape of the subpixel arrangement, exhibits the identical straight line boundary in the horizontal direction as illustrated by boundary 15 in FIG. 3a. The vertical boundary illustrated as boundary 25 in FIG. 3b, while providing some improvement, still results in significant boundary noise for images with a boundary formed in the vertical direction.

Figure 4A:
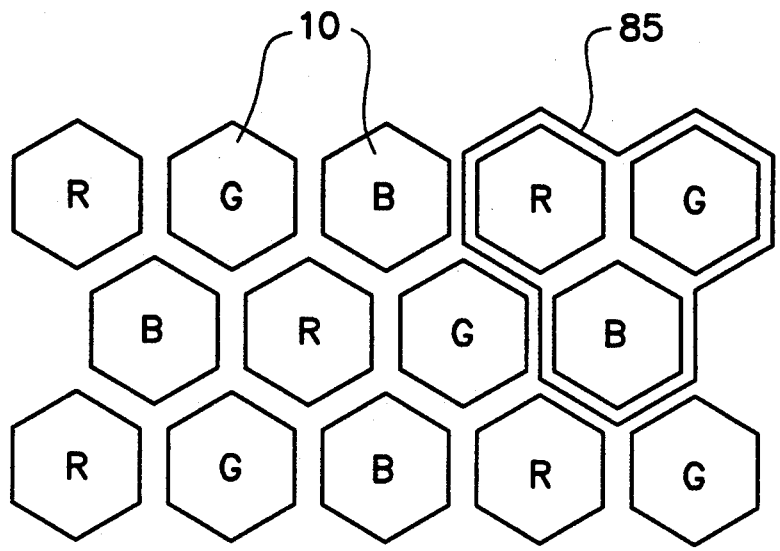
FIGS. 4a and 4b illustrate the hexagonal pixel arrangement of the present invention.

The hexagonal pixel arrangement of the present invention is illustrated in FIG. 4a wherein individual pixel 85 comprises a red, green, and blue subpixel, each of which is of hexagonal shape and located at the vertex of a triangle. As can be seen, the boundaries of the individual subpixels are contiguous with those of the other subpixels in the individual pixel and with those of adjacent subpixels in the display matrix.

This grouping of hexagonal subpixels results in a more uniform pixel shape and decreased boundary noise resulting from the orientation of the image boundary with respect to the pixel boundary within the mosaic of the display.

This hexagonal subpixel pattern represents geometrically, the highest density per unit area or closest packing of subpixels possible, which assures that it is the most efficient arrangement possible for a given resolution. That is, efficiency in packing density can be measured as the ratio of the active area to the inactive area of the display. In reference to FIG. 4a the elements 10 are the active area and the remaining area between each subpixel is inactive. The equilateral hexagon, being the optimal packing density of subpixels 10 maximizes the active area of the display for a given subpixel to subpixel separation design rule.

In addition, this arrangement allows the display of an image more consistently with orientation of the image on the display. As can be seen, the image boundary is rendered identically for each 60 degrees as opposed to the conventional shifted row delta which has two non-uniform axes which are spaced 90 degrees apart.

This uniform symmetrical orientation of boundary axes results in greatly reduced pattern noise compared to the shifted row delta because the images are rendered more consistently with respect to orientation within the display.

Figure 4B:
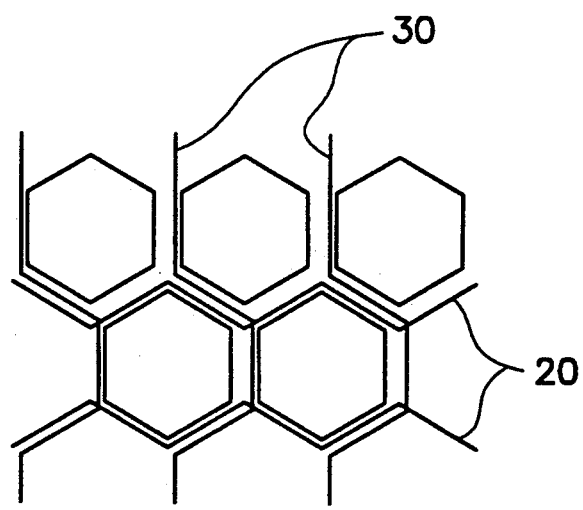

The inventive display configuration also results in a more uniform length of the row and column address lines. As illustrated in FIG. 4b the row address lines 20 and column address lines 30 will have similar shapes and lengths. While the row address lines of FIG. 20 which jog between the individual hexagonal subpixels are clearly longer than the straight row address lines 20 of FIG. 2, the column address lines 30 of FIG. 4b are much shorter than the column address lines 30 of FIG. 2 which jog between the shifted square elements of the shifted row delta pattern. The net result is that for hexagonal pattern the total address line length is less and the length of the column and row address lines is more closely matched.

Figure 5A:
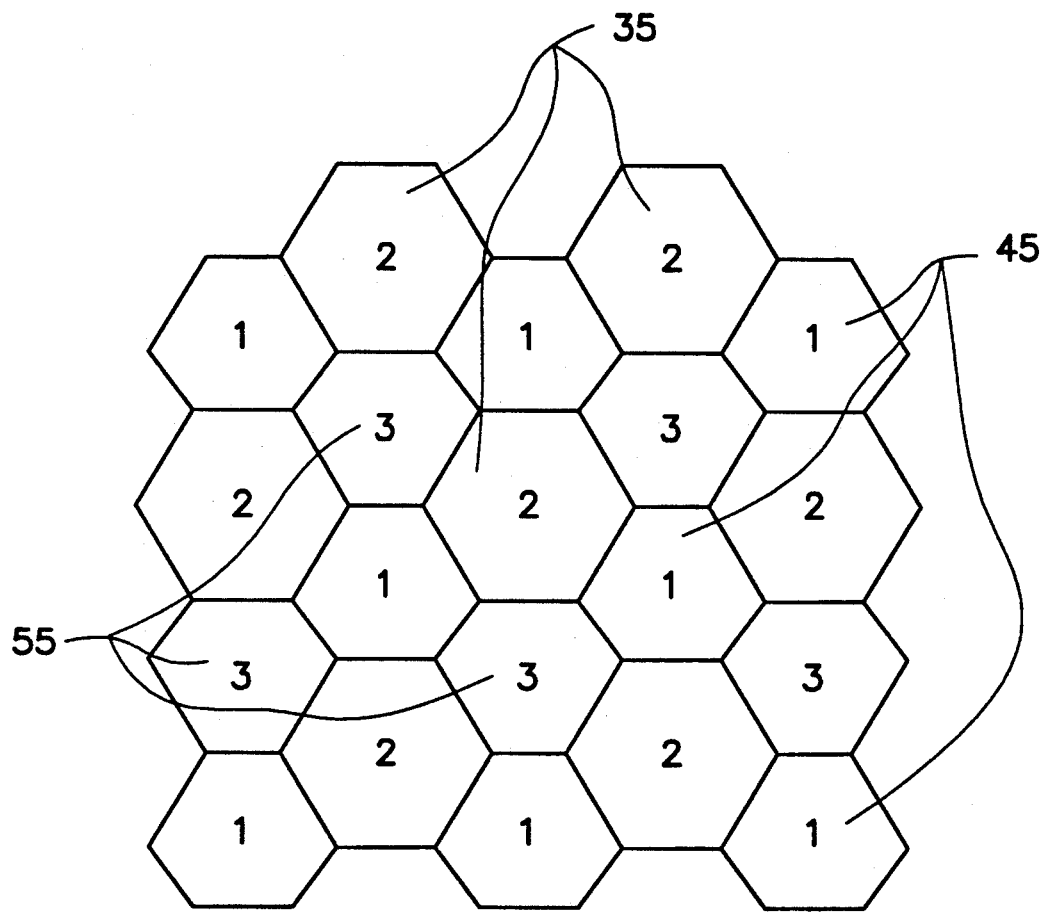
FIGS. 5a and 5b illustrate the variation in subpixel relative size possible using the present invention.
Figure 5B:
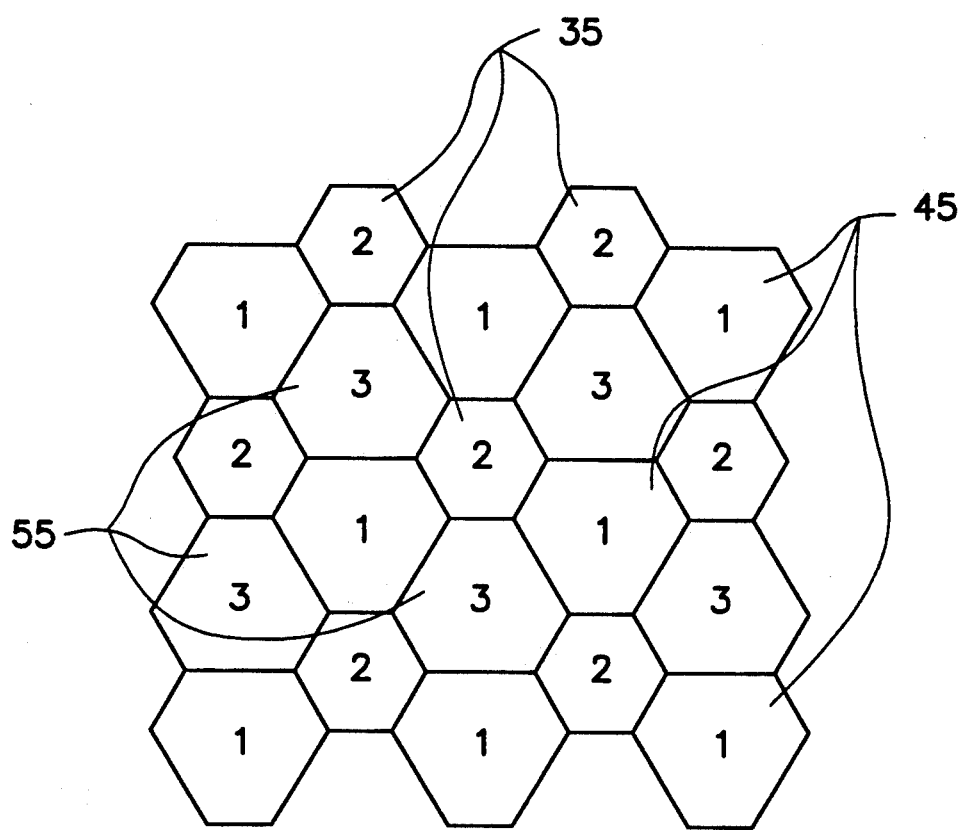

An important additional feature of the hexagonal subpixel arrangement is the flexibility in relative subpixel size. As illustrated in FIGS. 5a and 5b, predetermined ones of the individual subpixels may be either enlarged or reduced in size relative to the other subpixels in a given pixel without significantly distorting the shape of the other subpixels and while retaining essentially contiguous boundaries between all subpixels within the display.

Although this size variation does distort the element shape somewhat, the distortion for a relative area differential of 10-15% is not perceptible in most cases. FIG. 5a for example, illustrates the case where subpixel color element 35 of each pixel has been expanded in area relative to subpixels 45 and 55. As can be seen, subpixel color element 35 retains an equilateral hexagon shape of expanded area while subpixels 45 and 55 are somewhat distorted and of relatively smaller area compared to subpixel elements 35.

FIG. 5b illustrates the case where subpixel elements 35 have been reduced in size compared to subpixel elements 45 and 55. Again, subpixel element 35 retains the equilateral hexagon shape and subpixel elements 45 and 55 are of somewhat distorted hexagon shape but of relatively increased area compared to the area of subpixel element 35.

For a liquid crystal display color pixels are constructed by placing colored filters registered either immediately in front of or immediately behind a liquid crystal cell. The liquid crystal cell itself acts as a controllable light valve. Each color dot intensity can therefore be controlled from black through its particular color and maximum luminance by controlling the amount of light which is allowed to pass through the individual crystal cell.

The individual color filters are selected from a limited set of suitable materials. Both the thickness of the filter material and the chemical composition and concentration of the active filter agent determine the luminance transmission of a color pixel per unit area. Since, in general these characteristics are dictated by the fabrication method, environmental constraints, and the physics of the material considered, the brightness of an individual pixel can only be controlled independently by the transmission of the light valve and the relative area of the display dot.

An added feature of the inventive pixel pattern is therefore the ability to utilize a disproportionate pixel area in order to offset various restraints imposed by the selection of a particular color filter material.

While the inventive display configuration represents a slightly more complex design than the conventional shifted row delta, the improved image quality will actually either reduce the required resolution, and/or provide an image of increased image quality. For a given required image quality the reduction in resolution can have significant benefits including increased display brightness, improved production yields, reduced video band width requirements, reduced line driver density and speed requirements, and decreased image memory requirements.

While certain specific advantages resultant from the use of the hexagonal subpixel arrangement have been discussed, it will be apparent that other benefits may be obtained which result from the increased image quality, efficiency, and design flexibility available through use of the inventive display arrangement. It is to be understood that modifications and adaptations may be made by those skilled in the art without departing from the scope of the invention as claimed.

What is claimed is:

1. A display comprising a plurality of adjacent pixels wherein each pixel comprises;

first, second and third subpixels arranged in a triangular configuration wherein each subpixel has a hexagonal shape and the boundaries of adjacent subpixels are substantially contiguous within each pixel and between adjacent pixels and wherein said second subpixel is an equilateral hexagon having a smaller surface area than that of said first and third subpixels and the shape of said first and third subpixels is a non-equilateral hexagon.

2. A display comprising a plurality of adjacent pixels wherein each pixel comprises;

first, second and third subpixels arranged in a triangular configuration wherein each subpixel has a hexagonal shape and the boundaries of adjacent subpixels are substantially contiguous within each pixel and between adjacent pixels and wherein said second subpixel is an equilateral hexagon having a larger surface area than that of said first and third subpixels and the shape of said first and third subpixels is a non-equilateral hexagon.

3. A display in accordance with claim 2 wherein said first, second and third subpixels are of the primary colors red, green and blue respectively.

* * * * *